(12) United States Patent
Paul et al.

(10) Patent No.: US 10,379,509 B2
(45) Date of Patent: Aug. 13, 2019

(54) AUTOMATION TECHNOLOGY FIELD DEVICE

(71) Applicant: Endress + Hauser GmbH + Co. KG, Maulburg (DE)

(72) Inventors: Tobias Paul, Schopfheim (DE); Ralph Stib, Schonau (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 159 days.

(21) Appl. No.: 15/117,522

(22) PCT Filed: Jan. 30, 2015

(86) PCT No.: PCT/EP2015/051879
§ 371 (c)(1),
(2) Date: Aug. 9, 2016

(87) PCT Pub. No.: WO2015/124401
PCT Pub. Date: Aug. 27, 2015

(65) Prior Publication Data
US 2016/0349713 A1    Dec. 1, 2016

(30) Foreign Application Priority Data

Feb. 18, 2014  (DE) .................. 10 2014 102 021

(51) Int. Cl.
*G05D 11/00*        (2006.01)
*G05B 19/042*       (2006.01)
*G05B 11/01*        (2006.01)

(52) U.S. Cl.
CPC .......... *G05B 19/0425* (2013.01); *G05B 11/01* (2013.01); *G05B 2219/24028* (2013.01);
(Continued)

(58) Field of Classification Search
CPC ..... G01D 11/245; G01D 21/00; H02M 7/003; G01R 21/133; H01L 31/02021;
(Continued)

(56) References Cited

U.S. PATENT DOCUMENTS 6,272,025 B1 * 8/2001 Riggio .................... H01F 3/10
                                                    363/133
7,548,072 B2   6/2009 Griessbaum
(Continued)

FOREIGN PATENT DOCUMENTS

DE     102006015659 A1    8/2007
DE     102006062184 A1    6/2008
(Continued)

OTHER PUBLICATIONS

German Search Report, German Patent Office, Munich, DE, dated Oct. 22, 2014.
(Continued)

*Primary Examiner* — Tuan A Vu
(74) *Attorney, Agent, or Firm* — Bacon & Thomas, PLLC

(57) ABSTRACT

An automation technology field device with at least two connection terminals to which a two-wire line or a four-wire line can be connected, such that a loop current can be supplied to the field device via the connection terminals. A safety device is provided which is used to ensure the electromagnetic compatibility and/or the explosion proofing of the field device, wherein the safety device is connected to each connection terminal via one line each, and wherein at least one current converter arranged around the line is provided, which reads back the loop current in at least one of the two lines between the safety device or parts of the safety device and the connection terminals in a galvanically isolated manner.

4 Claims, 1 Drawing Sheet

(52) U.S. Cl.
CPC ............. *G05B 2219/25428* (2013.01); *G05B 2219/25462* (2013.01)

(58) Field of Classification Search
CPC .......... G05B 2219/24028; G05B 2219/25428; G05B 2219/25262; G05B 19/0425; G05B 11/01
See application file for complete search history.

(56) References Cited

U.S. PATENT DOCUMENTS

| | | | |
|---|---|---|---|
| 7,835,125 | B2 | 11/2010 | Freiburger |
| 8,314,413 | B2 | 11/2012 | Kieta |
| 9,194,718 | B2 | 11/2015 | Matzen |
| 9,423,469 | B2 | 8/2016 | Gudel |
| 2003/0117751 | A1 | 6/2003 | Murabayashi |
| 2004/0184517 | A1 | 9/2004 | Westfield |
| 2009/0236012 | A1* | 9/2009 | Gass ................ B23Q 11/0092 144/427 |
| 2010/0026518 | A1* | 2/2010 | Kirst .................... G01D 11/245 340/870.05 |
| 2011/0141644 | A1* | 6/2011 | Hastings ........... H01L 31/02021 361/93.2 |
| 2011/0208440 | A1* | 8/2011 | Pechstein ............... G01D 21/00 702/30 |
| 2011/0211378 | A1* | 9/2011 | Maroon ................ H02M 7/003 363/125 |
| 2013/0018609 | A1* | 1/2013 | Filippenko ........... G01R 21/133 702/62 |
| 2015/0318772 | A1* | 11/2015 | Jahshan .................. H02P 23/00 318/400.41 |

FOREIGN PATENT DOCUMENTS

| | | |
|---|---|---|
| DE | 102008045139 A1 | 3/2010 |
| DE | 102009050645 A1 | 4/2011 |
| EP | 1860513 A2 | 11/2007 |
| EP | 2423693 A1 | 2/2012 |

OTHER PUBLICATIONS

International Search Report, EPO, The Netherlands, dated Apr. 30, 2015.

English Translation of the International Preliminary Report on Patentability, WIPO, Geneva, CH, dated Sep. 1, 2016.

* cited by examiner

AUTOMATION TECHNOLOGY FIELD DEVICE

TECHNICAL FIELD

The invention relates to a field device in automation technology.

BACKGROUND DISCUSSION

Field devices serving to capture and/or modify process variables are frequently used in process automation technology. Sensors, such as fill level measuring devices, flow meters, pressure and temperature measuring devices, pH-redox potential meters, conductivity meters, etc., are used for recording the respective process variables, such as fill level, flow, pressure, temperature, pH level, and conductivity. Actuators, such as, for example, valves or pumps, are used to influence process variables. Thus, the flow rate of a fluid in a pipeline section or a filling level in a container can be altered by means of actuators. Field devices, in general, refer to all devices which are process-oriented and which provide or edit process-relevant information. In addition to the aforementioned sensors and actuators, units that are directly connected to a field bus and used for communication with superordinate units, such as, for instance, remote I/Os, gateways, linking devices, and wireless adapters, are also generally referred to as field devices. The company group Endress+Hauser produces and distributes a large variety of such field devices.

Such field devices convert a physical or chemical measured variable to an analog output signal corresponding to the measured value and transmittable via a two-wire line. In order to also operate the field devices in safety-critical applications, these must meet certain specifications. For this purpose, the international standard, IEC/EN 61508, in particular, serves as the basis for the specification, design, and operation of a "Safety Instrumented System" (SIS for short), such as a field device. IEC/EN 61508 as a basic standard uses an approach based upon the risk assessment:

An assessment is made of the risk, based upon which the resulting required "Safety Integrity Level" (SIL for short) for components and systems with security functions is determined.

These SIL-rated components and systems should reduce the existing risk of a device, such as a field device, to an acceptable level, or "tolerable risk." In this regard, errors which are uncertain of being detected, in particular, adversely affect the "tolerable risk."

For increased safety, i.e., to minimize the "tolerable risk" of the field devices, the analog output signal that is output or is to be transmitted, and which is fed into the two-wire cable via two connection terminals, must be read back. In known field devices of the prior art, this is typically implemented via a shunt resistor, which is provided for measuring current in the field device. This shunt resistor is located in the field device behind all explosion protection and/or EMC (Electromagnetic Compatibility) measures. Fault currents caused by faulty explosion protection and/or EMC measures might, therefore, not be detected and contribute to errors which are uncertain of being detected in the determination of "tolerable risk."

SUMMARY OF THE INVENTION

The invention is thus based upon the objective of optimizing the reading back of the transmitted analog output signal.

The objective is achieved according to the invention by a field device of automation technology, wherein the field device includes at least two connection terminals to which a two-wire or four-wire line can be connected so that a loop current can be supplied to the field device via the connection terminals, wherein a safety device is provided that serves to ensure the electromagnetic compatibility and/or explosion safety of the field device, wherein the safety device is connected to each connection terminal via one line each, and wherein at least one current converter arranged around the line is provided, which reads back the loop current in at least one of the two lines between the safety device or parts of the safety device and the connection terminals in a galvanically isolated manner.

The invention thus uses a galvanically isolated current transducer instead of a shunt resistor, which reads back the loop current in one of the two lines between the safety devices and the connection terminals. In the ideal case, the current converter used for reading back is therefore located directly and immediately behind the connection terminals and thus in front of all EMC and explosion protection measures or safety devices of the field device. In some cases, this is not technically feasible, so that the current converter is located in front of at least parts of the safety device of the field device. As mentioned above, a field device can function as both sensor and actuator. It goes without saying that the invention relates to both embodiments of a field device.

An advantageous embodiment provides that the current converter is an inductive and/or capacitive current converter. Current converters based upon the following technologies are particularly suitable as inductive current converters:

C-type current transducers
Closed loop hall effect
Eta technology
Isolation amplifier technology
IT-type closed loop
Open loop hall effect
PRiME An advantageous embodiment provides that an insulation means is provided between the line and the current converter, which, up to a predefined voltage, prevents electrical arcing.

An advantageous embodiment provides that distance specifications of the current converter with respect to the line comply with the standard, IEC DIN EN 60079, from the year 2012 for explosion-hazard areas.

BRIEF DESCRIPTION OF THE DRAWINGS

The invention is further illustrated with reference to the following drawings. Illustrated are.

DETAILED DISCUSSION IN CONJUNCTION WITH THE DRAWINGS

Figure 1:
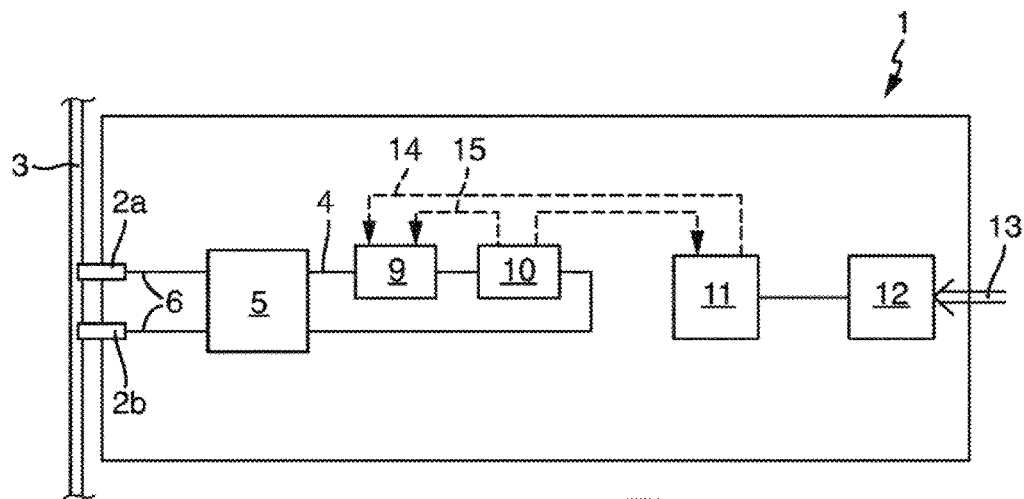
FIG. 1: is a field device designed according to the prior art.

FIG. 1 shows a field device designed according to the prior art. The figure shows the basic design of a field device of automation technology. The chemical or physical quantity 13 is transmitted to a sensor element 12, which converts it into an electrical signal. The analog measurement signal generated in this manner is then supplied to a computing unit, such as a microprocessor 11. Typically, the analog measurement signal is digitized for this purpose—for example, by means of an analog/digital converter (not shown). In the computing unit 11, the measurement signal is corrected for linearity and temperature history, if required. An analog set point of the loop current corresponding to the measured value is generated by the computing unit 11 and supplied to a control circuit for setting a loop current 4 in a two-wire line 3 (optionally, a four-wire line as well) to which the field device 1 is connected. Two connection terminals 2 (optionally, four connection terminals) are used for connecting the field device 1. The loop current 4 flows back to the second connection terminal 2b via the first connection terminal 2a, a safety device 5, a shunt resistor 10, via—optionally—an actuator 9, and, again, via the safety device 5. The safety device 5 is here shown by way of example and, in its concrete form, can include both EMC measures, i.e., electromagnetic compatibility measures, as well as explosion protection measures, i.e., measures relating to guidelines for explosion protection.

The actuator 9 may simply be a transistor, to which a first control signal 14 is supplied by the computing unit 11 and a second control signal 15 is supplied by the shunt resistor 10. The shunt resistor 10 is typically implemented by a precision resistor. The voltage drop across the shunt resistor 10, which is proportional to the loop current 4, is supplied to the computing unit 11 and used there for determining a control deviation from the set point of the loop current, whereupon the actuator 9 is driven accordingly. The actuator 9 is an optional component which is present only in the case where the field device acts as a sensor. In the case where the field device acts as an actuator, no actuator 9 and no sensor element 12 are required, since only the loop current 4 is read out via the shunt resistor, in order to use the loop current as a control value.

Figure 2:
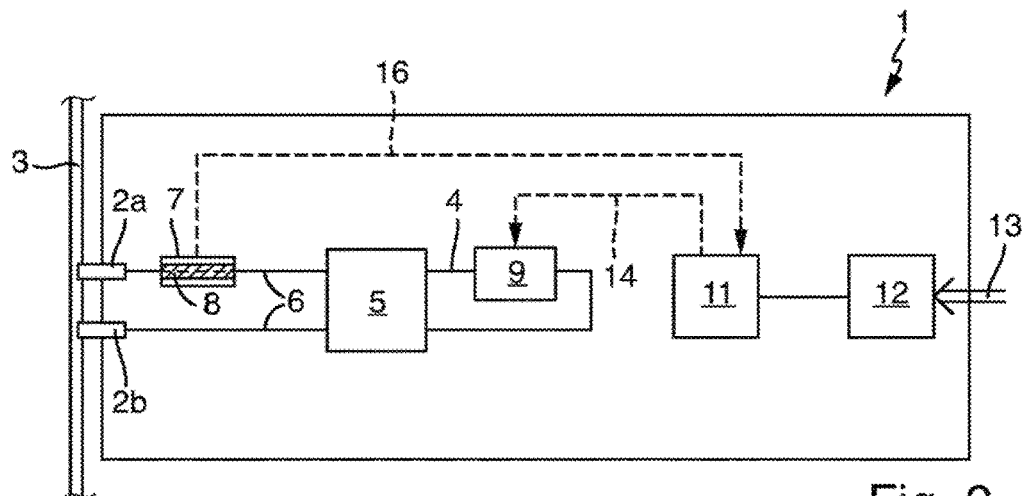
FIG. 2: is a first embodiment of the field device according to the invention.

FIG. 2 shows a first embodiment of the field device according to the invention. The field device of FIG. 2 is designed as a sensor and, therefore, includes a sensor element 12. This is supplied with the process variable or the physical quantity 13 and processed in accordance with the teachings of the figure description for FIG. 1. According to the invention, the field devices shown in FIG. 2 include a current reading device, which reads back the loop current 4 in a galvanically isolated manner and returns the read value to the computing unit 11 via a read-out signal 16. The current converter 7 is thus not part of the line and not integrated into the line 6, but arranged around it. In FIG. 2, the continuous line 6 around which the current converter 7 is arranged is indicated by a dashed line. Thus, between the current converter 7 and the line 6, no electric current flows, up to a predefined voltage or flashover voltage/breakdown voltage. In particular, the loop current 4 does not pass through the current converter 7. The current converter 7 is arranged around the line 6 such that, due to its technical configuration, it reads back the loop current 4 contactlessly.

The current converter 7 may, in principle, be an optical, inductive, or capacitive current converter. An inductive and/or capacitive current transducer has proven to be particularly advantageous, since these do not have to be supplied with additional energy, as is the case with an optocoupler, for example. Current converters 7 based upon the following technologies are particularly suitable as inductive current converters 7:

C-type current transducers
Closed loop hall effect
Eta technology
Isolation amplifier technology
IT-type closed loop
Open loop hall effect
PRiME Furthermore, the current converter 7 includes an insulation means 8 that is located between the line 3 and the current converter 7, so that, up to a predefined voltage, electrical arcing is prevented.

To allow for the use of the field device 1 in explosion-hazard areas, it may be provided that distance specifications, for the current converter with respect to the line 6, comply with standard IEC DIN EN 60079 from the year 2012 for explosion-hazard areas. This standard provides appropriate distances for various voltage ranges. In order to now ensure a predefined voltage for a circuit, the isolation means must be designed such that, up to this predefined voltage, it prevents an electric arcing. From this, distance specifications result which, for the technical implementation between the line 6 and the current converter 7, must be complied with.

In the embodiment shown in FIG. 2, all the elements of the safety device 5 are behind the current reading device, so that the current reading device 7 is arranged between the connection terminals 2 and the safety device 5.

Figure 3:
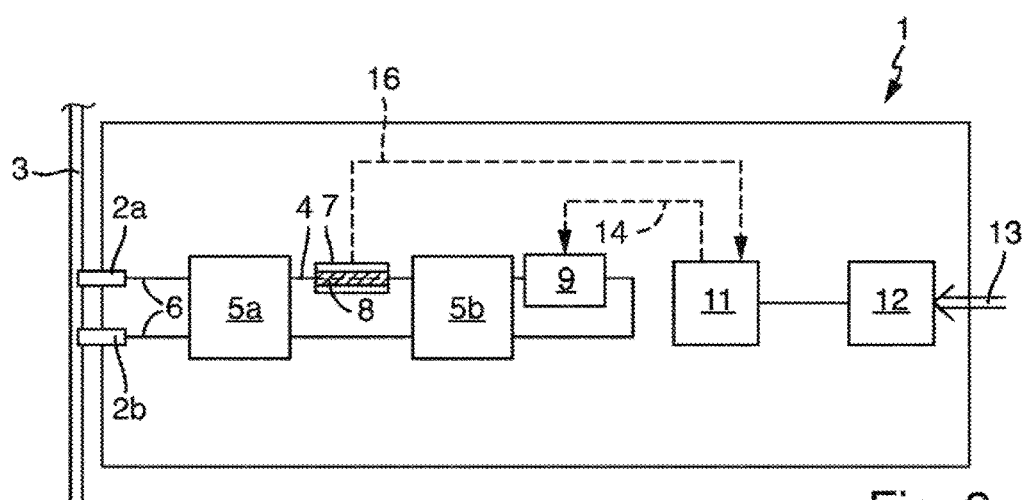
FIG. 3: is a second embodiment of the field device according to the invention.

FIG. 3 shows a second embodiment of the field device 1 according to the invention.

The field device of FIG. 3 is designed as a sensor and, therefore, includes a sensor element 12. This is supplied with the process variable or the physical quantity 13 and processed in accordance with the teachings of the figure description for FIG. 1. In contrast to the embodiment described in FIG. 2, in the embodiment described in FIG. 3, parts of the safety device 5a are located in front of the current converter 7, and parts of the safety device 5b are located behind the current converter 7. For example, a gas discharge tube, which represents part of the safety device 5 and is used to discharge the peak currents occurring in the event of a lightning strike, could be located in front of the current converter 7 in order to protect it against overload.

The invention claimed is:

1. A field device of automation technology, having:
   at least one current converter;
   at least two connection terminals to which a two-wire line or a four-wire line can be connected, so that a loop current can be supplied to the field device via said at least two connection terminals;
   a computing device which is arranged to receive signals from said current converter and adapted to generate a set point of said loop current;
   a safety device that serves to ensure the electromagnetic compatibility and/or explosion safety of the field device, wherein:
   said safety device is connected to each of said at least two connection terminals via one line each; and
   said at least one current converter is arranged contactlessly around said one line, wherein said current converter reads back the loop current in at least one of two lines between said safety device or parts of said safety device and said connection terminals in a galvanically isolated manner and returns the read value to said computing unit via a read-out signal, wherein
   said computing device determines a control deviation from said set point of said loop current via said read-out signal from said at least one current converter.

2. The field device according to claim 1, wherein:
   said at least one current converter is an inductive and/or capacitive current converter.

3. The field device according to claim 1, further having:
an insulation means, which, up to a predefined voltage, prevents electrical arcing, said insulating means isolated between said line and said current converter.

4. The field device according to claim 1, wherein:
distance specifications of said current converter with respect to said line comply with standard IEC DIN EN 60079 from the year 2012 for explosion-hazard areas.

\* \* \* \* \*